US008725701B2

(12) United States Patent
Parkes et al.

(10) Patent No.: US 8,725,701 B2
(45) Date of Patent: May 13, 2014

(54) MERGER AND ACQUISITION DATA VALIDATION

(75) Inventors: Alastair Parkes, Reading (GB); Mari Hasegawa, Menlo Park, CA (US); Ravi Manjunatha, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 758 days.

(21) Appl. No.: 12/247,290

(22) Filed: Oct. 8, 2008

(65) Prior Publication Data

US 2010/0088132 A1    Apr. 8, 2010

(51) Int. Cl.
*G06F 7/00* (2006.01)
*G06F 17/30* (2006.01)

(52) U.S. Cl.
CPC .................. *G06F 17/30575* (2013.01)
USPC ............. 707/690; 707/694; 707/703

(58) Field of Classification Search
CPC ................................. G06F 17/30575
See application file for complete search history.

(56) References Cited

U.S. PATENT DOCUMENTS

| | | | | |
|---|---|---|---|---|
| 6,151,608 | A * | 11/2000 | Abrams | 707/679 |
| 6,581,039 | B2 | 6/2003 | Marpe et al. | |
| 6,615,220 | B1 | 9/2003 | Austin et al. | |
| 7,058,807 | B2 * | 6/2006 | Grawrock et al. | 713/172 |
| 7,159,209 | B1 * | 1/2007 | Srinivasan et al. | 707/999.1 |
| 7,299,216 | B1 | 11/2007 | Liang et al. | |
| 7,774,300 | B2 * | 8/2010 | Hsiao et al. | 707/602 |
| 7,890,430 | B2 * | 2/2011 | Lopatic | 705/59 |
| 8,290,951 | B1 * | 10/2012 | Joa et al. | 707/736 |
| 8,291,501 | B2 * | 10/2012 | Lynch | 726/26 |
| 2002/0107809 | A1 * | 8/2002 | Biddle et al. | 705/59 |
| 2004/0064487 | A1 | 4/2004 | Nguyen et al. | |
| 2004/0139111 | A1 * | 7/2004 | Schoettger et al. | 707/104.1 |
| 2005/0251812 | A1 | 11/2005 | Hayward | |
| 2006/0004595 | A1 | 1/2006 | Rowland et al. | |
| 2006/0222163 | A1 * | 10/2006 | Bank et al. | 379/221.08 |
| 2006/0287961 | A1 * | 12/2006 | Mori et al. | 705/59 |
| 2008/0205655 | A1 * | 8/2008 | Wilkins et al. | 380/279 |
| 2008/0235805 | A1 * | 9/2008 | Pfitzmann et al. | 726/27 |
| 2009/0249488 | A1 * | 10/2009 | Robinson et al. | 726/26 |

FOREIGN PATENT DOCUMENTS

WO    WO 9634354 A1 * 10/1996

OTHER PUBLICATIONS

"SwiftForm as Data Migration Tool", http://www.miscot.com/swiftform.htm.
"Arbutus software—migrate", http://www.arbutussoftware.com/products-migrate.htm.
"Informatica Data Explorer and Informatica Data Quality" http://www.sun.com/third-party/srsc/resources/informatica/InfaDQDEbrochure.pdf.
"DataMAPPER", http://www.adbtech.com/data1.html.
"DataSlave 1.2", http://www.modemtools.com/programs/Baycastle-Software-Ltd/DataSlave.htm.

(Continued)

*Primary Examiner* — Miranda Le
(74) *Attorney, Agent, or Firm* — Miles & Stockbridge P.C.

(57) ABSTRACT

Systems and methods are provided that perform data validation in real time. By uploading the source data from spreadsheets or entering the data directly into an application, the required validations can be run and reported in real time. Users can then either extract the data back into spreadsheets for manipulation, and then re-upload it, or correct the data directly within the application. Once the data set has passed all validations, it is then passed to the technical team for upload into the transactional system.

9 Claims, 14 Drawing Sheets

(56) References Cited

OTHER PUBLICATIONS

"DatabaseBridge", http://www.skywaytechnology.com/products0.htm.
"caTissue Data Migration" http://gforge.nci.nih.gov/docman/view.php/18/7786/caTissueDataMigration_TBPT_F2F_2007.ppt.
"Exploring Attribute Correspondences Across Heterogeneous Databases by Mutual Information" http://delivery.acm.org/10.1145/1280000/1278034/71eerk1m02qfjrx6.pdf?key1=1278034&key2=7201407021&coll=Portal&dl=GUIDE&CFID=22383522&CFTOKEN=43600732.
"Efficient development of data migration transformations" http://delivery.acm.org/10.1145/1010000/1007692/p915-carreira.pdf?key1=1007692&key2=9481407021&coll=Portal&dl=GUIDE&CFID=22383522&CFTOKEN=43600732.
"Issues and approaches for migration/cohabitation between legacy and new systems", http://delivery.acm.org/10.1145/180000/170145/p471-nassif.pdf?key1=170145&key2=3312407021&coll=Portal&dl=GUIDE&CFID=22383522&CFTOKEN=43600732.

* cited by examiner

» Home | Customers | Update Customers

Update Customers

800

| | |
|---|---|
| Cancel | Delete | Apply Changes |

Customer Ref1: 447
Customer Ref2:
Org Name: Terayon Communication Systems, Inc.
Duns Num:
Tax Reg Num:
Web Url: http://www.terayon.com
Legacy Entity Name:
Iface Source: ONYX
Locked? N
Validated? N
Error Code
Error Description

» Home | Address | Update Address

Update Address

1000

Address Ref1 356
Customer Ref1 356

Address1 5970 Optical Court
Address2
Address3
Address4
City San Jose
State California
Province California
County US
Country Descr United States

[ Cancel ] [ Delete ] [ Apply Changes ]

Fig. 12

» Home | Contacts | Update Contacts

Update Contacts

1200

[Cancel] [Delete] [Apply Changes]

- Contact Ref1: 1277856
- Customer Ref1: 494
- Address Ref1: 494
- First Name: Allen
- Last Name: Fox
- Full Name: Allen Fox
- Person Title:
- Job Title: IT
- Phone Number: 8188803500
- Fax Number: 8188803505
- Email Address: allen.fox@ind.alcatel.com
- Iface Source: ONYX
- Locked?: N
- Validated?: N
- Error Code:

Fig. 14

» Home | Support | Update Support

Update Support

1400

Customer Id
Orig Customer Ref
Orig Customer Name
Orcl Customer Number
Orcl Customer Party Number
Orcl Customer Name
Customer Address Id
Orig Customer Address Ref
Orig Customer Address
Customer Map Flag
Orcl Customer Address
Orig Country Ref
Bill To Customer Id
Orig Bill To Customer Ref
Orig Bill To Customer Cancel

MERGER AND ACQUISITION DATA VALIDATION

FIELD OF THE INVENTION

One embodiment is directed generally to data validation, and more particularly to validating data before migration.

BACKGROUND INFORMATION

The phrase mergers and acquisitions ("M&A") refers to the aspect of corporate strategy, corporate finance and management dealing with the buying, selling and combining of different companies that can aid, finance, or help a growing company in a given industry grow rapidly without having to create another business entity. When companies are acquired or merged, it is often the case that data from one company needs to be transferred to the platform of the acquiring company. However, the platform of the company being acquired may be different from the platform of the acquiring company. For example, the acquired company may use SAP® business software, whereas the acquiring company uses Oracle® business software. In such a case, the data must be migrated from one platform to another.

In a typical data migration, the data would be compiled for loading, a load would be attempted into the destination system, rejected records would be analyzed and corrected, and then another attempt would be made to load them. Once in the system, the data would be tested and any which were incorrect would be deleted and reloaded, or more likely would need to be corrected and retested by loading on a new environment.

SUMMARY OF THE INVENTION

One embodiment is a method for validating data before migration from a first platform to a second platform. The method comprises receiving data to be validated from the first platform, validating the data at a third platform, and sending validated data the second platform.

BRIEF DESCRIPTION OF THE DRAWINGS

FIG. 5 is an example products list UI in accordance with an embodiment;

FIG. 6 is an example products list popup window UI in accordance with an embodiment;

FIG. 8 is an example customers list popup window UI in accordance with an embodiment;

FIG. 10 is an example addresses list popup window UI in accordance with an embodiment;

FIG. 12 is an example contacts list popup window UI in accordance with an embodiment;

FIG. 14 is an example licenses and support list popup window UI in accordance with an embodiment.

DETAILED DESCRIPTION

The migration of data into a transactional system such as Oracle E-Business Suite requires that the source data, whether extracted from one or more source systems or manually entered into spreadsheets, is complete and correct. Multiple entities may reference each other, and each entity must have all required fields populated according to the validation rules the destination system enforces. Additionally, any mappings or references to existing destination system data must also be validated as must any validations required to ensure that the data conforms to the business processes within the company. Failure to correctly reference associated entities or to correctly populate a field will result in the system application program interfaces or Open Interface tables rejecting the record for loading.

Typically in a large migration project, such as those taking place as part of a merger and acquisition, there is a long lead time in the validation process due to the number of iterations of loading, error reporting, error resolution, and re-loading for each record. This can account for as much as 80% of the project duration and 60% of the effort. An example would be the load of support licenses and their associated data, such as customer, address, contacts and parts. Each license references one of more parts, customers, addresses and contacts. Thus, to load the license into a new platform the associated data must also be provided. A number of fields need to be populated and in the correct format for each of these entities. A failure to populate a required field or reference will cause the record to be rejected. For example, if the license references a particular combination of customer, address and contact then the customer data provided must include that customer, address and contact and in the correct combination.

The process of ensuring the extracted data is complete and correct and will pass all the required system validations is lengthy, complex, and time consuming. This process requires multiple iterations of data extracts being passed between the teams extracting the data, the business analysts determining the transformation of the source data, and the team that finally loads the data into the destination system and reports on the validation failures.

An embodiment refines the above process by performing the data validation in real time. By uploading the source data from spreadsheets or entering the data directly into an application, the required validations can be run and reported in real time. The application can highlight rows in the spreadsheets that have data validation issues. Users can then either extract the data back into spreadsheets for manipulation, and then re-upload it, or correct the data directly within the application. Once the data set has passed all validations, it is then uploaded into the transactional system.

Figure 1:
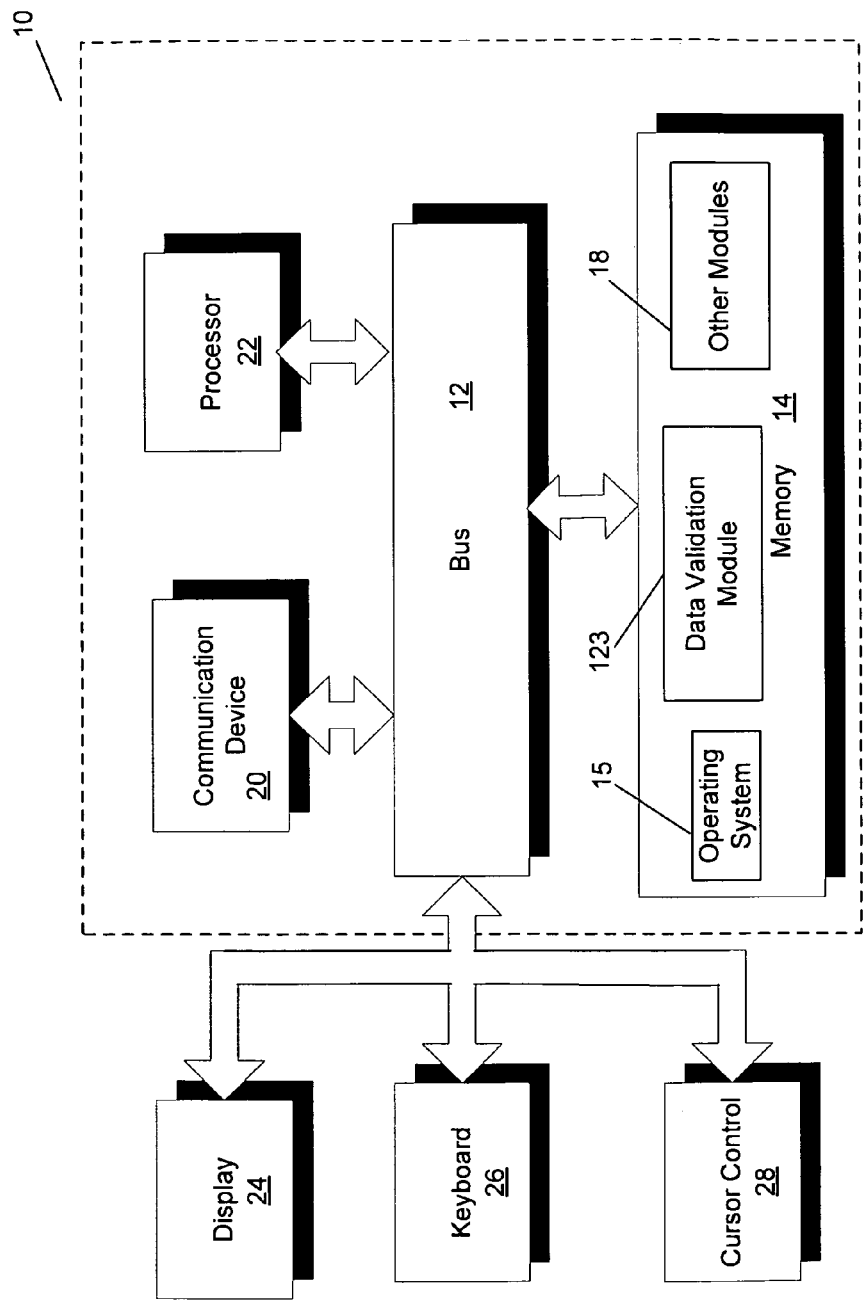
FIG. 1 is a block diagram of a system for data validation and migration in accordance with an embodiment.

FIG. 1 is a block diagram of a system 10 that can implement an embodiment that validates data for migration from one platform to another. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with system 10.

In one embodiment, memory 14 stores software modules that provide functionality when executed by processor 22. The modules include an operating system 15 that provides operating system functionality for system 10. The modules further include a data validation module 123. These modules are described in greater detail below. Additional, fewer, and/or different modules 18 may also be included in system 10.

Figure 2:
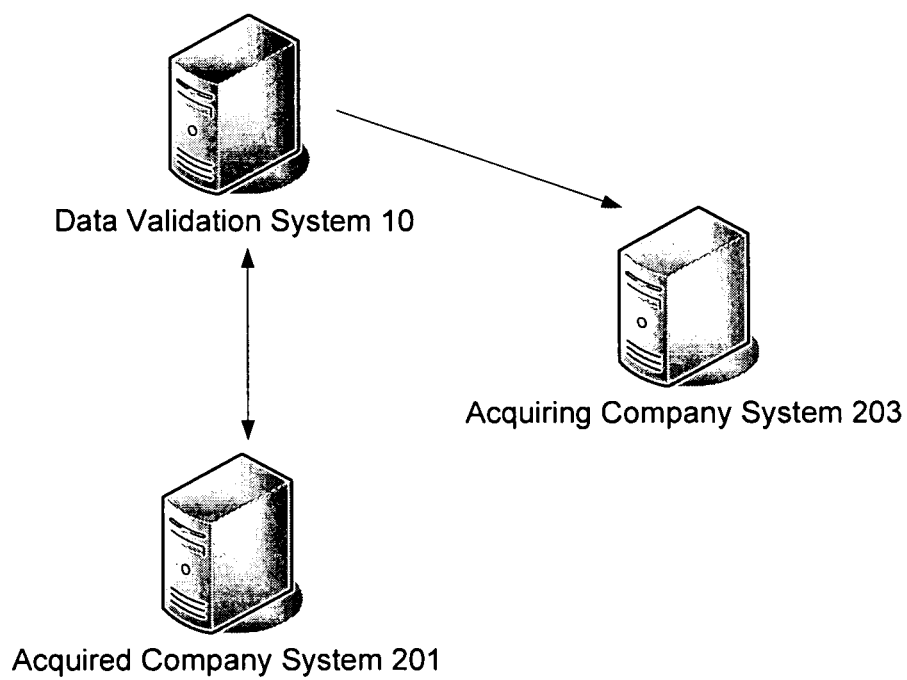
FIG. 2 is an example environment of a system for data validation and migration in accordance with an embodiment.

FIG. 2 illustrates an example environment where the data validation module may be utilized. In this example, data from a company being acquired is to be migrated to the system of the company making the acquisition. Acquired company system 201 includes the data to be migrated, and acquiring company system 203 is the destination of the migration. Information technology ("IT") staff at the acquired company establishes a connection between acquired company system 201 and data validation system 10, such as by a virtual private network "(VPN")", and upload data from the acquired company system 201 to data validation system 10. The uploaded data is validated and errors are reported by the IT staff. Validation may include checking for missing values, checking for duplicate values, detecting orphaned records, inspecting the integrity of internal mappings in the data (such as mapping customers to addresses), and validating a mapping of the data to a schema provided by the IT staff of the acquiring company. The IT staff of the acquired company may choose to correct the errors directly in the data validation system 10, or download the data back to the acquired company system 201 and correct it there. This process is iterated until there are no more errors to report. The data from acquired company system 201 is then migrated to the acquired company system 203.

Figure 3:
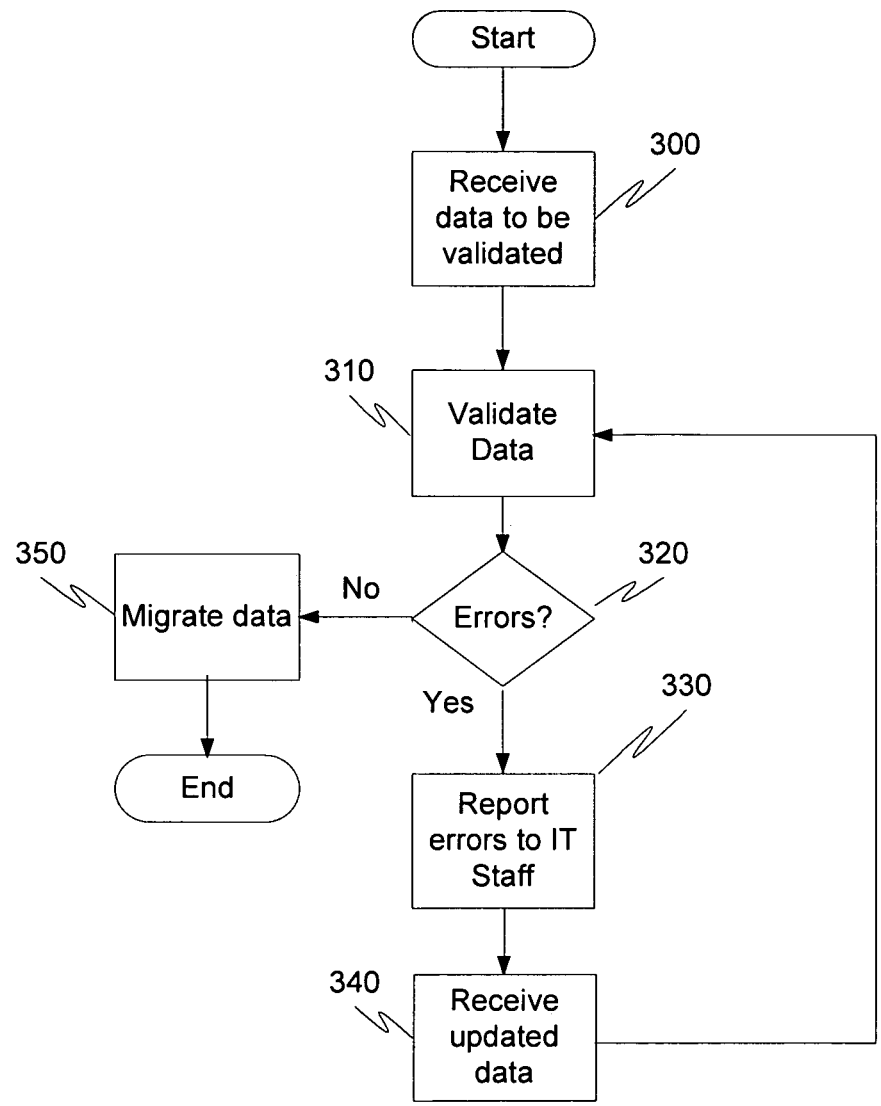
FIG. 3 is a flow diagram depicting a method for validating data for migration in accordance with an embodiment.

FIG. 3 illustrates a flow diagram of the functionality of data validation module 123 in accordance with an embodiment when validating data for migration from one platform to another. In one embodiment, the functionality of the flow diagram of FIG. 3 is implemented by software stored in memory and executed by a processor. In other embodiments, the functionality can be performed by hardware, or any combination of hardware and software. Data to be validated is first received from the acquired company system 201 (300). The data is then validated, which may include checking for missing values, checking for duplicate values, detecting orphaned records, inspecting the integrity of internal mappings in the data (such as mapping customers to addresses), and validating a mapping of the data to a schema provided by the IT staff of the acquiring company (310). If there errors in the data (320), the errors are reported to the IT staff of the acquired company (330). Updated data is then received (340), and the data is validated again (310). This process iterates until no errors are detected (320), at which point the data is migrated to the acquiring company system 203 (350).

Figure 4:
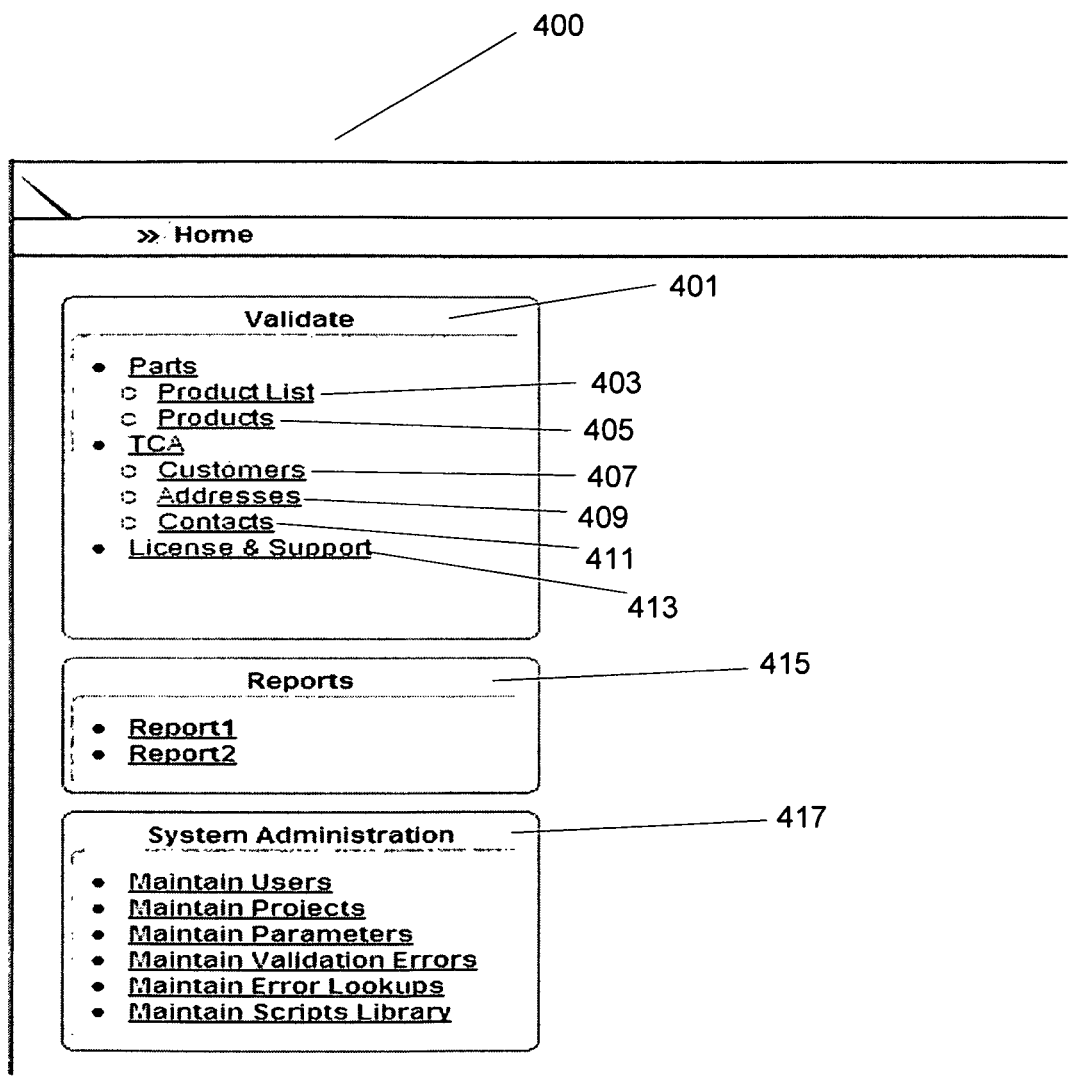
FIG. 4 is an example main menu user interface ("UI") in accordance with an embodiment.

FIG. 4 illustrates an example main menu user interface ("UI") 400 of the data validation module 123. Main menu UI 400 includes a Validate section 401 comprising links relating to the validation of parts information (e.g., software products), trade community architecture ("TCA") information (e.g., customer contact information), and license and support information. Parts information links include a Product list link 403 linking to a page for validating software product information, and a Products link 405 linking to an administrative page for adding products to the product list. TCA information links include a Customers link 407 linking to a page for validating customer information, an Addresses link 409 linking to a page for validating customer address information, and a Contacts link 411 linking to a page for validating contact information for individuals within the customer organizations. License and support link 413 links to a page for validating license and support information. Main menu UI 400 further includes a Reports section 415 comprising links to reports about the validation process, and a System Administration section 417 comprising links for administering users, projects, parameters, validation errors, error lookups, and scripts.

Figure 5:
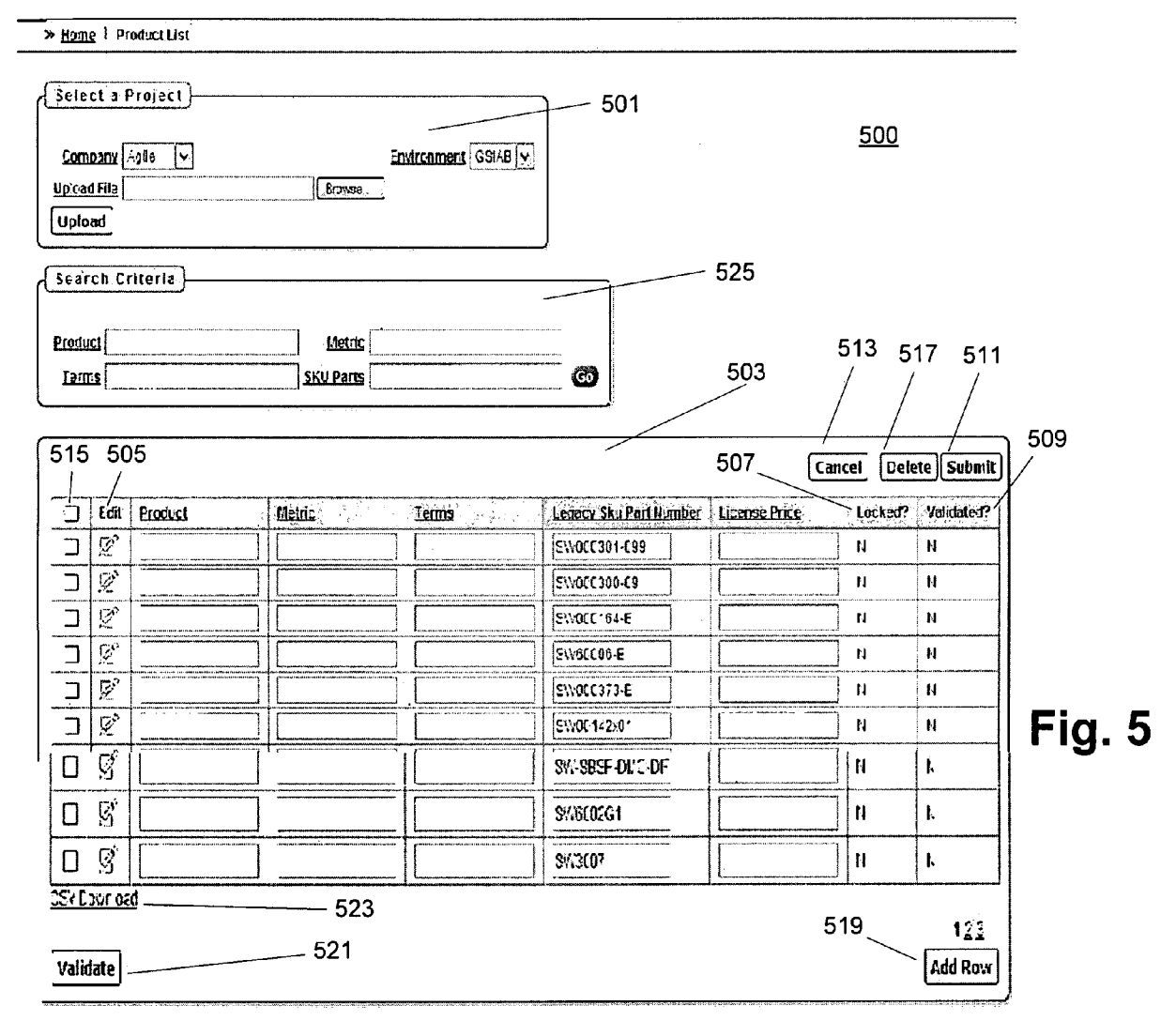
Figure 6:
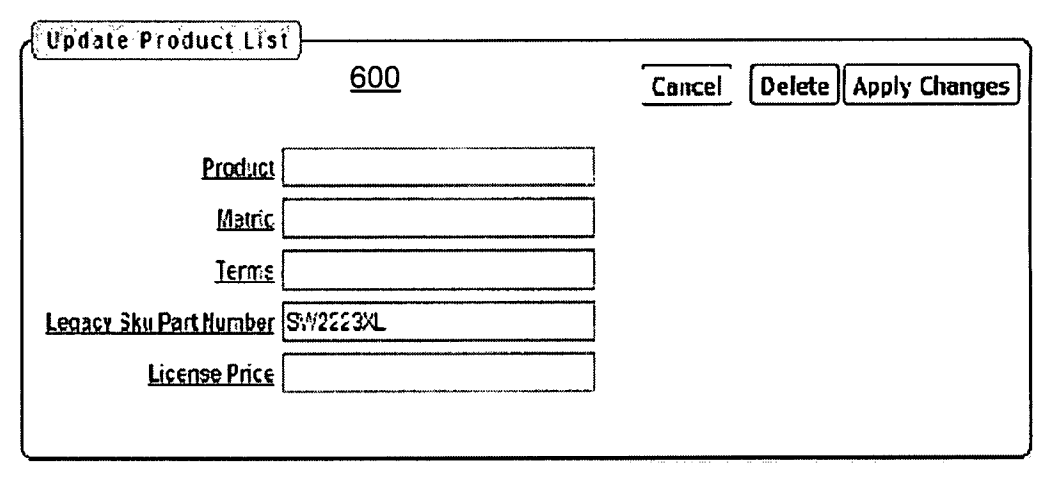

When a user clicks on Products List link 403, a Products List UI 500 (FIG. 5) is presented. Products List UI 500 includes a Project section 501 that allows the user to select a company from which product information needs to be validated, and an environment in which that data needs to be validated. Project section 501 further allows the user to browse for a tabular data file, such as a comma separated value ("CSV") file or an extensible Markup Language ("XML") file, containing product information for upload. When a project is selected, the products list data is displayed in Table 503. Each row in Table 503 represents a product, as provided in a CSV file from the acquired entity. Information regarding the products can be edited directly in the table, or by clicking the icon in the row edit column 505. Clicking this icon displays a popup window 600 (FIG. 6) that allows the user to edit information such as the product name, a company-specific product metric, terms associated with the product, a legacy part number for the product, and a license price for the product. The user can apply those changes, cancel the changes, or delete the product from the list. The data edited in popup window 600 is displayed in Table 503. Table 503 further includes locked column 507 indicating whether the row is editable, and validated column 509 indicating whether the row has passed validation. Changes made directly in the table may be applied using the submit button 511, or canceled using the cancel button 513. Individual or groups of rows may be deleted using check box column 515 and delete button 517, and rows may be added using add row button 519. Individual or groups of rows may be validated using check box column 515 and validate button 521. If rows fail validation, the errors are displayed in Table 503, which will be illustrated later. If the user wants to make changes to the data in a different application, the user may download the data (including error information) using the CSV download link 523. Products List UI further comprises a Search section 525 that allows the user to narrow the products list displayed in Table 503. The user may search for products by product name, company-specific product metrics, terms associated with the product, and the product part number.

Figure 7:
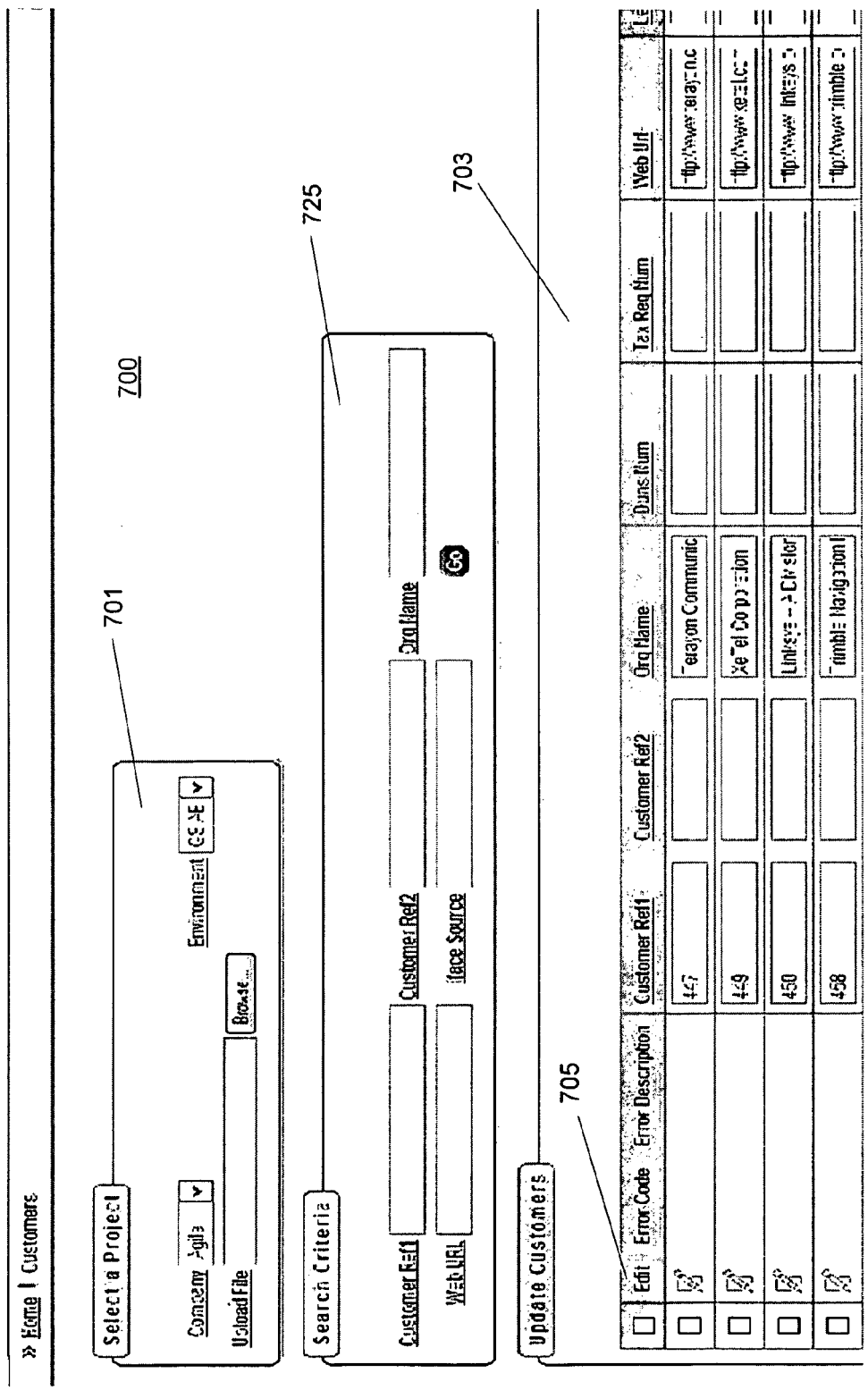
FIG. 7 is an example customers list UI in accordance with an embodiment.

Turning back to main menu UI 400, when a user clicks on Customers link 407, a Customers List UI 700 (FIG. 7) is presented. Customers List UI 700 includes a Projects section 701, Table section 703, and Search section 725 that are similar in function and operation to Projects section 501, Table section 503, and Search section 525, respectively, in FIG. 5, so for the sake of brevity only the differences are now described. Table section 703 displays customer information of the acquired company, for example, customer reference numbers, customer company names, tax registration numbers, customer URLs, legacy entity names, etc. As with table 503, this information can be edited directly in Table 703, or by clicking the icon in the row edit column 605 to edit the information in popup window 800 (FIG. 8). Also like Table 503, Table 703 displays whether rows are locked, validated, and described errors found during validation. Search section 725 is similar to Search section 525, but allows the user to search customers by customer reference numbers, customer company names, customer URLs, etc.

Figure 9:
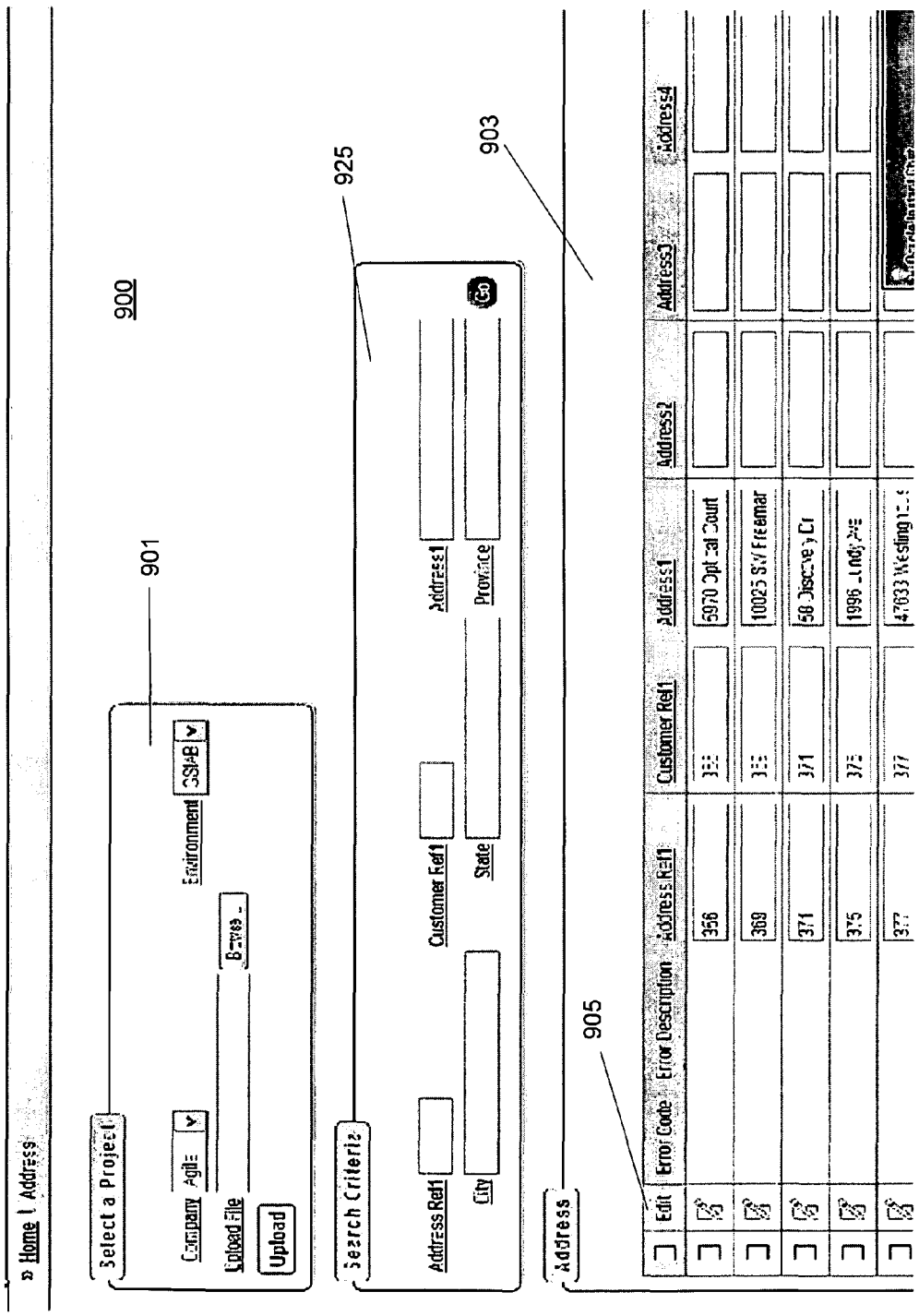
FIG. 9 is an example addresses list UI in accordance with an embodiment.

Turning back to main menu UI 400, when a user clicks on Addresses link 409, an Addresses List UI 900 (FIG. 9) is presented. Addresses List UI 900 includes a Projects section 901, Table section 903, and Search section 925 that are similar in function and operation to Projects section 501, Table section 503, and Search section 525, respectively, in FIG. 5, so for the sake of brevity only the differences are now described. Table section 903 displays address information of the acquired company, for example, an address reference number, a customer reference number, multiple address lines for precise locations, a city, a state, a province, a county, and country of the address. As with table 503, this information can be edited directly in Table 903, or by clicking the icon in the row edit column 905 to edit the information in popup window 1000 (FIG. 10). Also like Table 503, Table 903 displays whether rows are locked, validated, and described errors found during validation. Search section 925 is similar to Search section 525, but allows the user to search for an address by address and customer reference numbers, an address line, city, state, province, etc.

Figure 11:
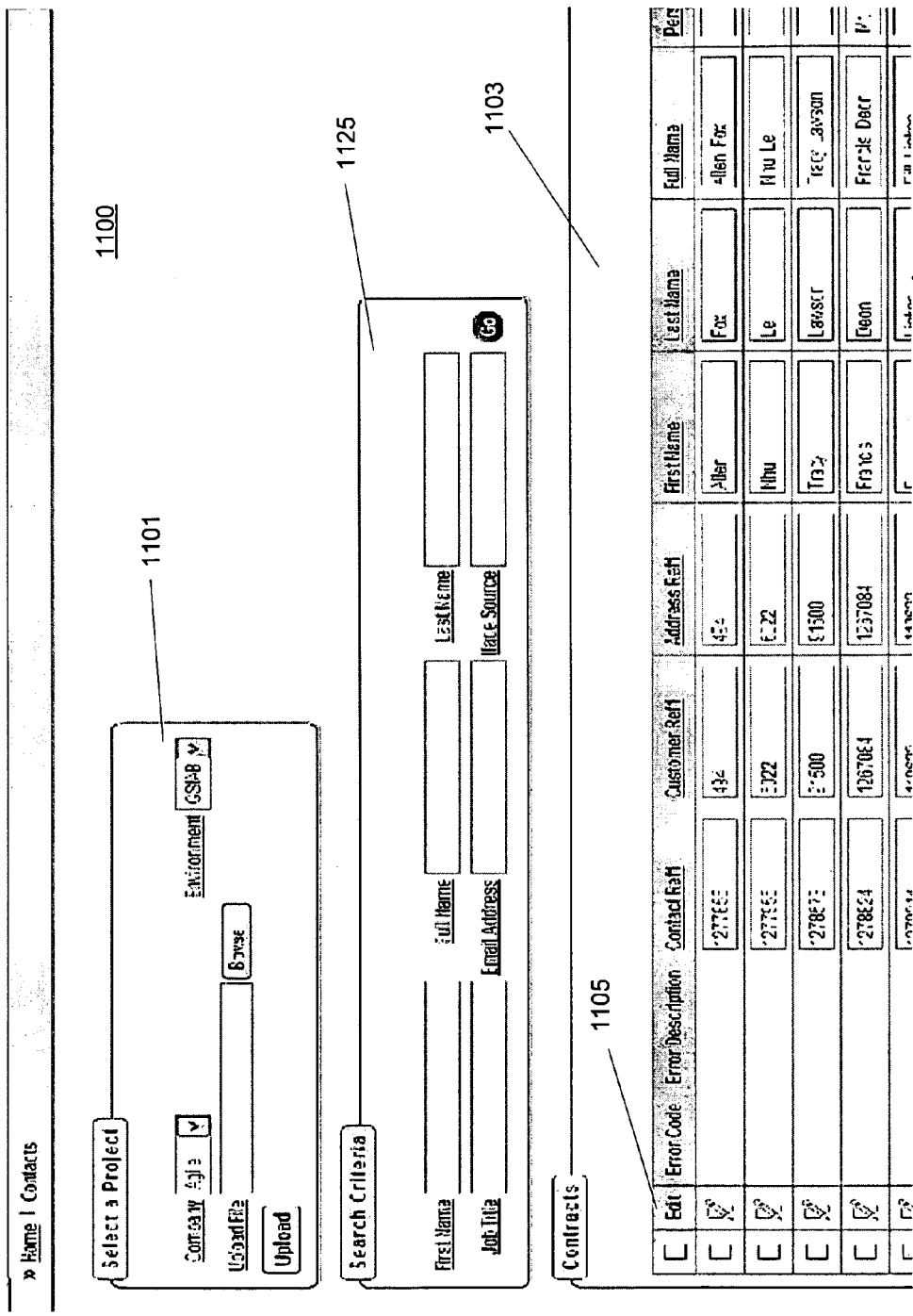
FIG. 11 is an example contacts list UI in accordance with an embodiment.

Turning back to main menu UI 400, when a user clicks on Contacts link 411, a Contacts List UI 1100 (FIG. 11) is presented. Contacts List UI 1100 includes a Projects section 1101, Table section 1103, and Search section 1125 that are similar in function and operation to Projects section 501, Table section 503, and Search section 525, respectively, in FIG. 5, so for the sake of brevity only the differences are now described. Table section 1103 displays contact information of the acquired company, for example, a contact reference number, a customer reference number, an address reference number, the name of the contact, the job title of the contact, the phone and fax numbers of the contact, the email address of the contact, etc. As with table 503, this information can be edited directly in Table 1103, or by clicking the icon in the row edit column 1105 to edit the information in popup window 1200 (FIG. 12). Also like Table 503, Table 1103 displays whether rows are locked, validated, and described errors found during validation. Search section 1125 is similar to Search section 525, but allows the user to search for a contact by name, job title, email address, etc.

Figure 13:
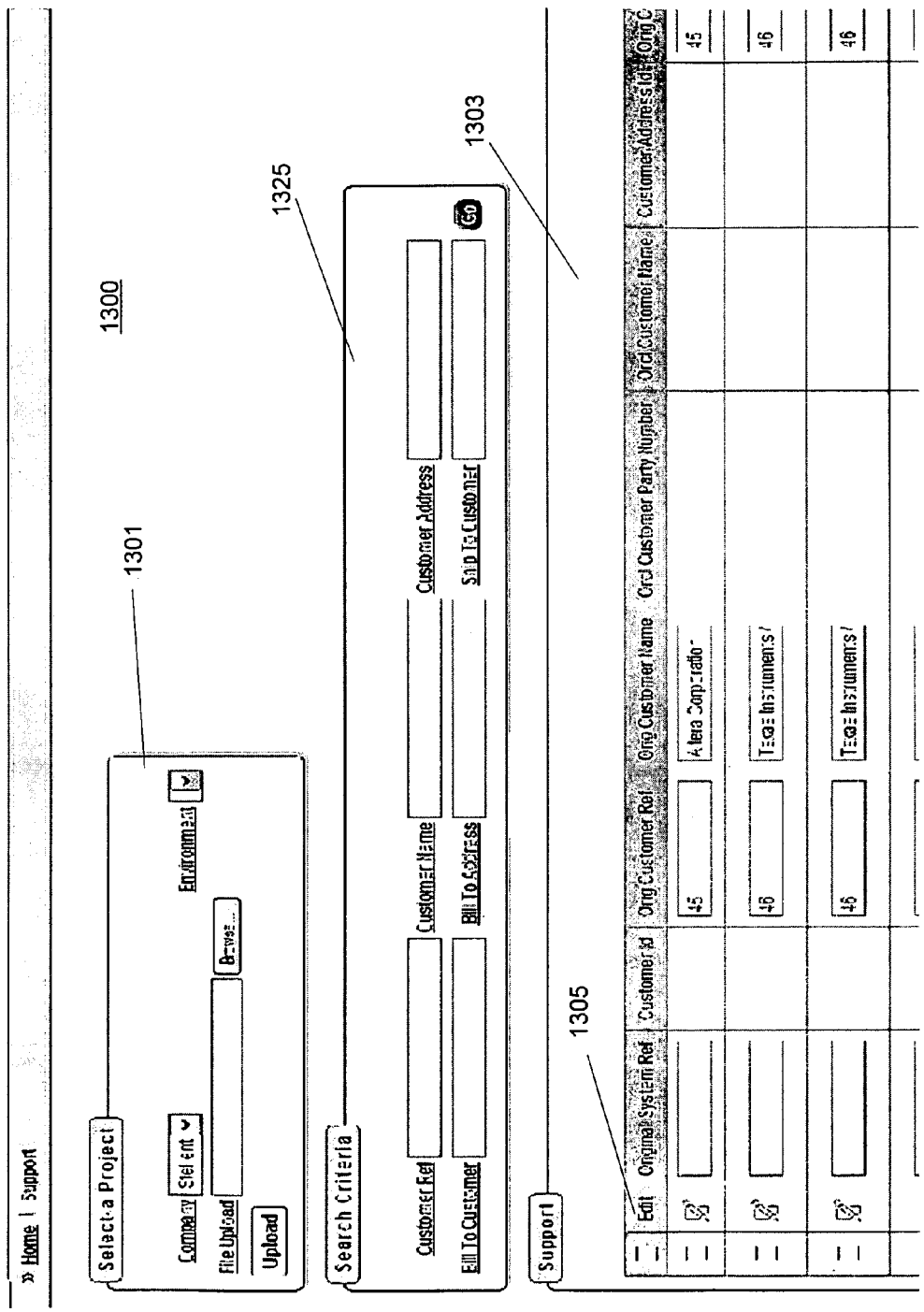
FIG. 13 is an example licenses and support list UI in accordance with an embodiment.

Turning back to main menu UI 400, when a user clicks on License and Support link 413, a License and Support UI 1300 (FIG. 13) is presented. Licenses and Support UI 1300 includes a Projects section 1301, Table section 1303, and Search section 1325 that are similar in function and operation to Projects section 501, Table section 503, and Search section 525, respectively, in FIG. 5, so for the sake of brevity only the differences are now described. Table section 1303 displays license and support information of the acquired company, for example, a customer ID, customer name, customer address, billing ID, etc., for a particular license. If the customer is also a customer of the acquiring company, the same data may be included for the acquiring company. As with table 503, this information can be edited directly in Table 1303, or by clicking the icon in the row edit column 1305 to edit the information in popup window 1400 (FIG. 14). Also like Table 503, Table 1303 displays whether rows are locked, validated, and described errors found during validation. Search section 1325 is similar to Search section 525, but allows the user to search for licenses by customer reference number, customer name, customer address, billing information, shipping information, etc.

By allowing the users to perform real-time validation prior to data-loading the overall effort of the migration may be reduced as much as 70%, and the duration of the project may be reduced as much as 40%. An advantage of this solution is that the business analysts or administrators involved in compiling the source data can ensure that the data set is complete and correct in advance of loading, and without the involvement of the information technology staff responsible for the destination system. Therefore it is not necessary to load the data into the transactional destination system in order to ensure it is correct.

Some embodiments of the invention have been described as computer-implemented processes. It is important to note, however, that those skilled in the art will appreciate that the mechanisms of the invention are capable of being distributed as a program product in a variety of forms. The foregoing description of example embodiments is provided for the purpose of illustrating the principles of the invention, and not in limitation thereof, since the scope of the invention is defined solely by the appended claims.

What is claimed is:

1. A computer implemented method for validating data before migration from a first computer software platform of a first organization to a second computer software platform of a second organization, comprising:
   uploading data associated with a first software license for a first enterprise software application to be validated from the first platform, wherein the first computer software platform is a different computer software platform than the second computer software platform, and the data from the first computer software platform must be validated before the data is associated with a second software license for a second enterprise software application on the second computer software platform, wherein the first software license is different than the second software license, and the first enterprise software application is different than the second enterprise software application;
   wherein the data comprises product names, license terms, and license prices;
   wherein the data further comprises customer information of the first organization comprising customer reference numbers, tax registration numbers and customer company names;
   wherein the data further comprises contact information of the first organization comprising contact names, addresses, and telephone numbers;
   wherein the data further comprises support license data, each support license data comprising a corresponding software product, corresponding customer, corresponding address and corresponding contact; and
   validating by a processor the data at a third platform;
   wherein the validating the data comprises checking for missing values among the data, checking for duplicate values among the data, detecting orphaned records, mapping a first subset of the data to be validated to a second subset of the data to be validated comprising a mapping of customers to addresses, verifying a mapping of the data to a second schema of the second platform and verifying that a customer, address and contact for one or more support licenses is in a correct combination, wherein the second schema is different from a first schema of the first platform;

generating a description of errors from the validating and allowing the errors to be corrected on the third computer platform that is different from the first computer platform and the second computer platform;

receiving updated data in response to the generated description and after the errors are corrected;

validating the updated data;

repeating the generating the description of errors, receiving updated data and validating the updated data until the validating the data does not generate errors; and associating the validated data with the second software license on the second computer software platform by migrating the validated data from the first computer software platform to the second computer software platform, wherein the validated data is not migrated to the second computer software platform until the data to be validated passes validation.

2. The method of claim 1, further comprising generating a user interface that comprises links related to validation of parts information and license and support information.

3. The method of claim 1, wherein the first platform is of an acquired company and the second platform is of an acquiring company.

4. A non-transitory computer-readable medium having instructions stored thereon that, when executed by a processor, cause the processor to validate data before migration from a first computer software platform of a first organization to a second computer software platform of a second organization, the validation comprising:

uploading data associated with a first software license for a first enterprise software application to be validated from the first platform, wherein the first computer software platform is a different computer software platform than the second computer software platform, and the data from the first computer software platform must be validated before the data is associated with a second software license for a second enterprise software application on the second computer software platform, wherein the first software license is different than the second software license, and the first enterprise software application is different than the second enterprise software application;

wherein the data comprises product names, license terms, and license prices;

wherein the data further comprises customer information of the first organization comprising customer reference numbers, tax registration numbers and customer company names;

wherein the data further comprises contact information of the first organization comprising contact names, addresses, and telephone numbers;

wherein the data further comprises support license data, each support license data comprising a corresponding software product, corresponding customer, corresponding address and corresponding contact; and validating by a processor the data at a third platform;

wherein the validating the data comprises checking for missing values among the data, checking for duplicate values among the data, detecting orphaned records, mapping a first subset of the data to be validated to a second subset of the data to be validated comprising mapping of customers to addresses, verifying a mapping of the data to a second schema of the second platform, wherein the second schema is different from a first schema of the first platform and verifying that a customer, address and contact for one or more support licenses is in a correct combination;

generating a description of errors from the validating and allowing the errors to be corrected on the third computer platform that is different from the first computer platform and the second computer platform;

receiving updated data in response to the generated description and after the errors are corrected;

validating the updated data;

repeating the generating the description of errors, receiving updated data and validating the updated data until the validating the data does not generate errors; and associating the validated data with the second software license on the second computer software platform by migrating the validated data from the first computer software platform to the second computer software platform, wherein the validated data is not migrated to the second computer software platform until the data to be validated passes validation.

5. The non-transitory computer-readable medium of claim 4, the validation further comprising generating a user interface that comprises links related to validation of parts information and license and support information.

6. The non-transitory computer-readable medium of claim 4, wherein the first platform is of an acquired company and the second platform is of an acquiring company.

7. A system for validating data before migration from a first computer software platform of a first organization to a second computer software platform of a second organization, comprising:

a memory having stored thereon instructions that cause the system to upload data associated with a first software license for a first enterprise software application to be validated from the first platform, wherein the first computer software platform is a different computer software platform than the second computer software platform, and the data from the first computer software platform must be validated before the data is associated with a second software license for a second enterprise software application on the second computer software platform, wherein the first software license is different than the second software license, and the first enterprise software application is different than the second enterprise software application;

wherein the data comprises product names, license terms, and license prices;

wherein the data further comprises customer information of the first organization comprising customer reference numbers, tax registration numbers and customer company names;

wherein the data further comprises contact information of the first organization comprising contact names, addresses and telephone numbers;

wherein the data further comprises support license data, each support license data comprising a corresponding software product, corresponding customer, corresponding address and corresponding contact; and validate the data at the third platform;

wherein the validate the data comprises checking for missing values among the data, checking for duplicate values among the data, detecting orphaned records, mapping a first subset of the data to be validated to a second subset of the data to be validated comprising a mapping of customers to addresses, validating by verifying a mapping of the license data to a second schema of the second platform, wherein the second schema is different from a first schema of the first platform and verifying that a customer, address and contact for one or more support licenses is in a correct combination; and a processor that executes the instructions; the instructions further causing the processor to generate a description of errors from the validating and allow the errors to be corrected on the third computer platform that is different from the first computer platform and the second computer platform;

receive updated data in response to the generated description and after the errors are corrected;

validate the updated data; and repeat the generate the description of errors, receive updated data and validate the updated data until the validate the data does not generate errors; and associating the validated data with the second software license on the second computer software platform by migrating the validated data from the first computer software platform to the second computer software platform, wherein the validated data is not migrated to the second computer software platform until the data to be validated passes validation.

8. The system of claim 7, wherein the first platform is of an acquired company and the second platform is of an acquiring company.

9. The system of claim 7, the validating further comprising generating a user interface that comprises links related to validation of parts information and license and support information.

* * * * *

UNITED STATES PATENT AND TRADEMARK OFFICE
CERTIFICATE OF CORRECTION

| | | |
|---|---|---|
| PATENT NO. | : 8,725,701 B2 | Page 1 of 1 |
| APPLICATION NO. | : 12/247290 | |
| DATED | : May 13, 2014 | |
| INVENTOR(S) | : Parkes et al. | |

It is certified that error appears in the above-identified patent and that said Letters Patent is hereby corrected as shown below:

In the Specification

In column 4, line 32, delete "extensible" and insert -- eXtensible --, therefor.

Signed and Sealed this
Fourteenth Day of October, 2014

Michelle K. Lee
*Deputy Director of the United States Patent and Trademark Office*